(12) United States Patent  
Shiu et al.

(10) Patent No.: US 8,665,218 B2  
(45) Date of Patent: Mar. 4, 2014

(54) PORTABLE DEVICE

(75) Inventors: Duan-Ruei Shiu, Taipei (TW);  
Jung-Hsing Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 330 days.

(21) Appl. No.: 13/025,163

(22) Filed: Feb. 11, 2011

(65) Prior Publication Data

US 2011/0193782 A1    Aug. 11, 2011

(30) Foreign Application Priority Data

Feb. 11, 2010   (TW) ............................... 99104476 A

(51) Int. Cl.  
*G06F 3/02* (2006.01)

(52) U.S. Cl.  
USPC ........... 345/168; 345/169; 345/173; 715/773; 715/863

(58) Field of Classification Search  
USPC .......... 345/156, 168, 169, 173, 174; 715/773, 715/863, 864, 866  
See application file for complete search history.

(56) References Cited

U.S. PATENT DOCUMENTS

| | | | |
|---|---|---|---|
| 2003/0048205 A1* | 3/2003 | He | 341/26 |
| 2005/0104855 A1* | 5/2005 | Grossmeyer | 345/169 |
| 2005/0225538 A1* | 10/2005 | Verhaegh | 345/173 |
| 2006/0197750 A1* | 9/2006 | Kerr et al. | 345/173 |
| 2007/0247442 A1* | 10/2007 | Andre et al. | 345/173 |
| 2008/0122796 A1 | 5/2008 | Jobs et al. | |
| 2009/0146957 A1* | 6/2009 | Lee et al. | 345/168 |
| 2009/0213081 A1* | 8/2009 | Case, Jr. | 345/173 |
| 2011/0260982 A1* | 10/2011 | Trout | 345/169 |
| 2011/0261058 A1* | 10/2011 | Luo | 345/441 |
| 2012/0306767 A1* | 12/2012 | Campbell | 345/173 |
| 2013/0002565 A1* | 1/2013 | Tumanov et al. | 345/173 |
| 2013/0019191 A1* | 1/2013 | Arnold | 715/765 |

FOREIGN PATENT DOCUMENTS

| | | |
|---|---|---|
| CN | 1811674 | 8/2006 |
| CN | 101488042 | 7/2009 |

* cited by examiner

*Primary Examiner* — Koosha Sharifi-Tafreshi  
(74) *Attorney, Agent, or Firm* — Jinaq Chyun IP Office

(57) ABSTRACT

A portable device including a body, a panel display, a touch sensor, and a positioning determining element is provided. The panel display and the touch sensor are disposed at a first surface and a second surface opposite to the first surface of the body. The positioning determining element is disposed in the body for determining the locations of each finger when the body is hold and defining a conformal keyboard corresponding to the shape of hands, so the user can execute programs via the finger actions on the touch sensor conveniently.

8 Claims, 3 Drawing Sheets

PORTABLE DEVICE

CROSS-REFERENCE TO RELATED APPLICATION

This application claims the priority benefit of Taiwan application Ser. No. 99104476, filed on Feb. 11, 2010. The entirety of the above-mentioned patent application is hereby incorporated by reference herein and made a part of this specification.

BACKGROUND OF THE INVENTION

1. Field of the Invention

The invention relates to a portable device and, more particularly, to a portable device with touch panel display.

2. Description of the Related Art

When a user uses a mobile tablet computer or an E-book, he or she needs to hold the device with both hands. However, since the mobile tablet computer is usually light and thin, and operating postures are limited, the hot keys are usually much fewer than that of a conventional notebook computer, which is rather inconvenient in usage. Moreover, it is not easy for the user to input many words without a standard keyboard. When the user inputs words or commands to execute a program, he or she needs to hold the body with one hand, and input the words or commands on the touch panel with the other hand. Thus, the user may not hold the mobile tablet computer or the E-book steadily, resulting in the input inconvenience.

BRIEF SUMMARY OF THE INVENTION

The invention provides a portable device convenient in usage.

The invention provides a portable device including a body, a panel display, a touch sensor and a positioning determining element. The panel display and the touch sensor are disposed at a first surface and a second surface opposite to the first surface of the body, respectively. The positioning determining element is disposed in the body for determining the locations of each finger when the body is hold and defining a conformal keyboard corresponding to the shape of hands.

In an embodiment of the invention, the portable device further includes an auxiliary element disposed in the body. The auxiliary element sends an alerting sound, an alerting light or vibrates to indicate that the conformal keyboard is set-up completely.

In the portable device of the embodiment in the invention, the touch sensor is a touch panel.

In the portable device of the embodiment in the invention, the conformal keyboard is a virtual keyboard.

In the portable device of the embodiment in the invention, the panel display displays a standard keyboard and the definition of keys of the conformal keyboard corresponds to that of the standard keyboard.

In the portable device of the embodiment in the invention, the panel display displays the conformal keyboard.

In the portable device of the embodiment in the invention, the touch sensor detects a multi touch signal and a single touch signal, and the body executes different programs according to moving trace of a multi touch signal detected by the touch sensor.

In the portable device of the embodiment in the invention, the auxiliary element sends out an alerting sound, an alerting light or vibrates to inform the user that the conformal keyboard definition is completed.

As stated above, when the portable device in the invention is held, the positioning determining element determines the holding position and set-up the conformal keyboard corresponding to the shape of hands, and thus, the user can execute programs conveniently via different combinations of the actions of the fingers on the touch sensor.

These and other features, aspects and advantages of the present invention will become better understood with regard to the following description, appended claims, and accompanying drawings.

DETAILED DESCRIPTION OF THE EMBODIMENTS

Figure 1:
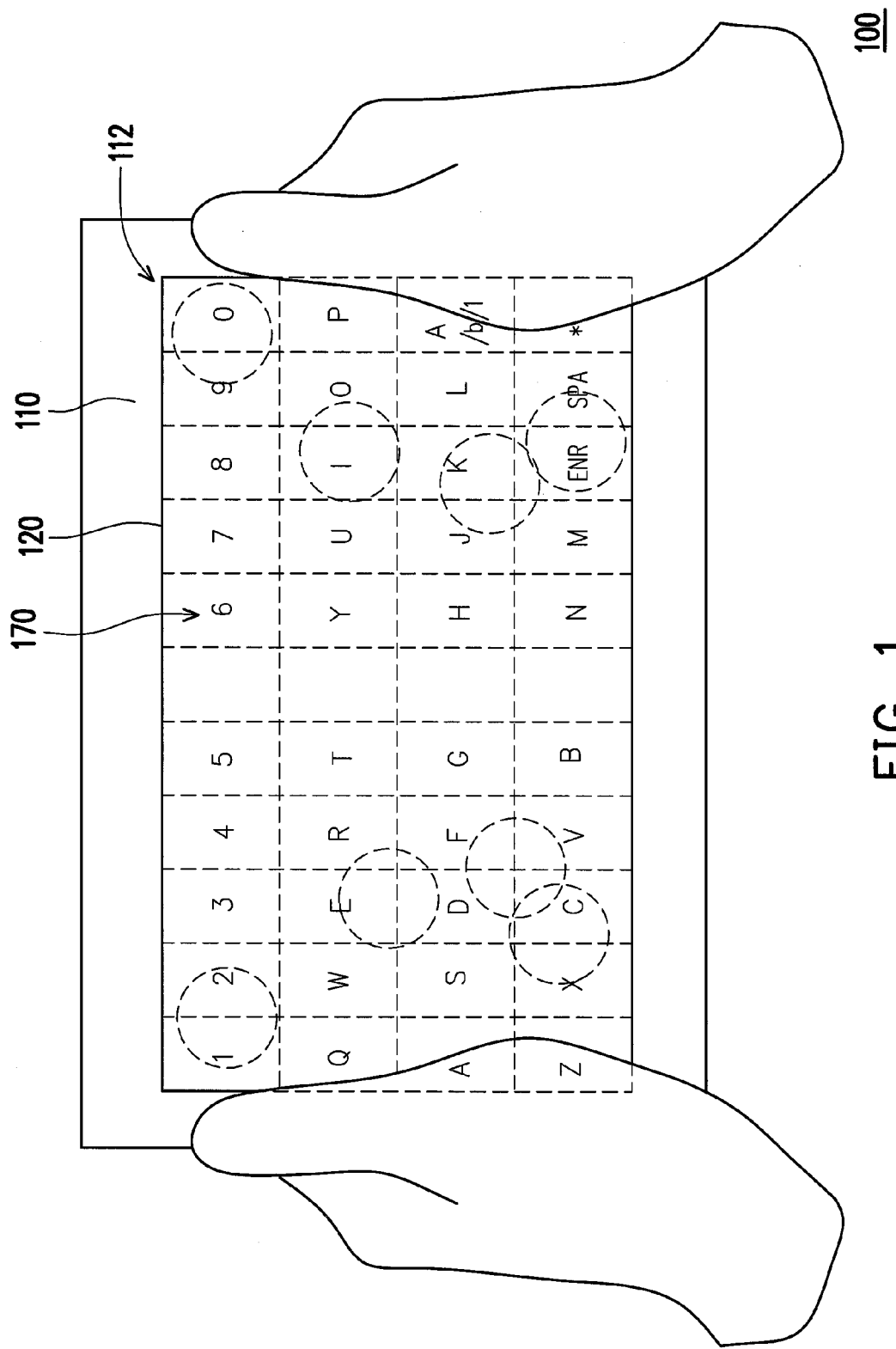
FIG. 1 is a schematic diagram showing that a portable device is held by a user in an embodiment of the invention.
Figure 2:
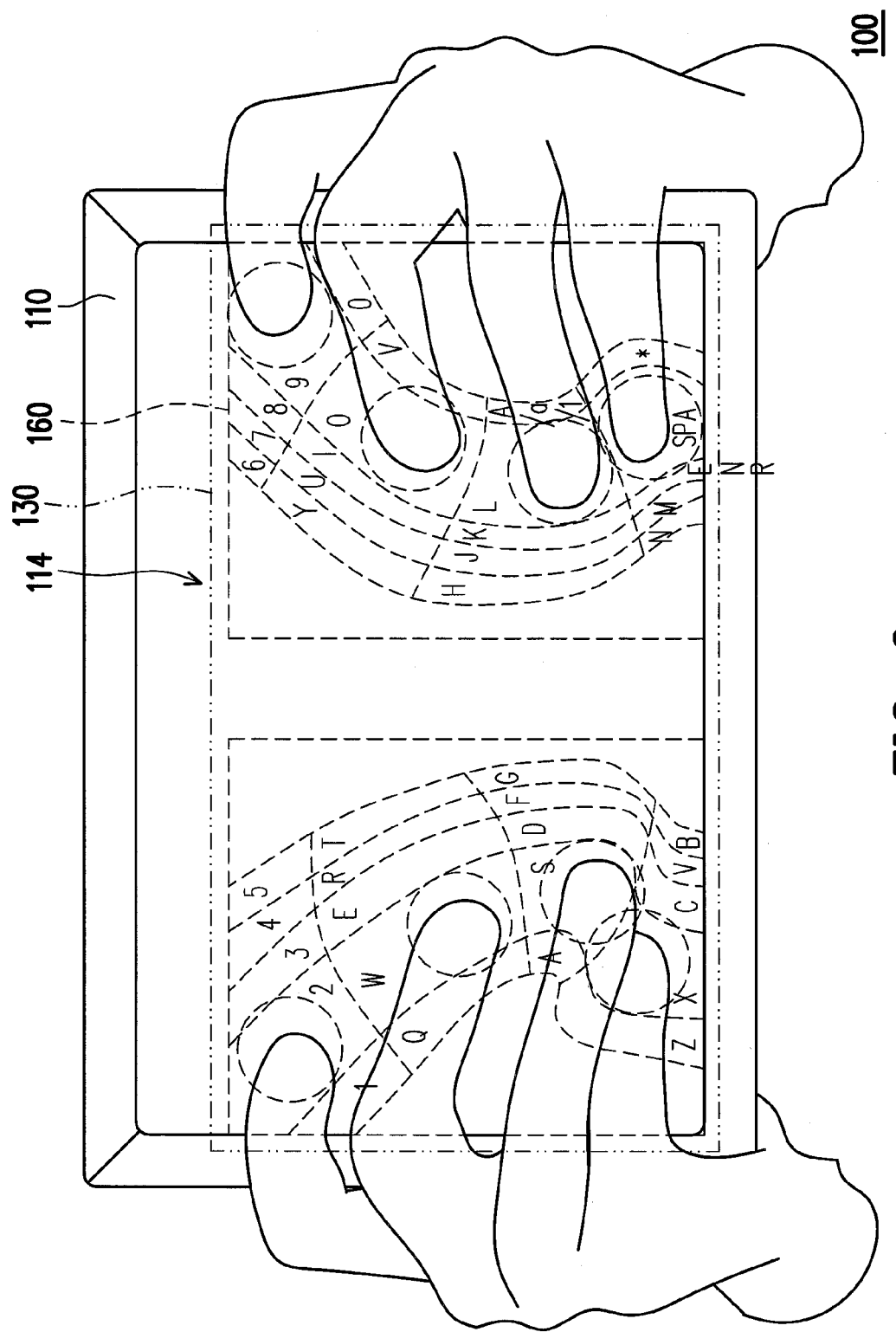
FIG. 2 is a schematic diagram showing that the portable device in FIG. 1 is held by a user viewed from another aspect.
Figure 3:
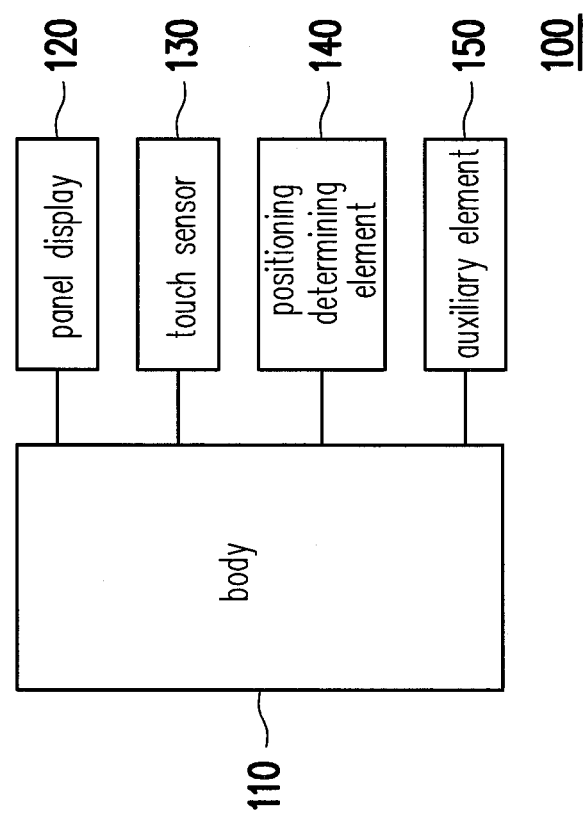
FIG. 3 is a schematic diagram showing the hardware structure of the portable device in FIG. 1 in an embodiment of the invention.

FIG. 1 is a schematic diagram showing that a portable device is held by a user in an embodiment of the invention. FIG. 2 is a schematic diagram showing that the portable device in FIG. 1 is held by a user viewed from another aspect. FIG. 3 is a schematic diagram showing the hardware structure of the portable device in FIG. 1 in an embodiment of the invention.

Please refer to FIG. 1, FIG. 2 and FIG. 3, a portable device 100 in the embodiment includes a body 110, a panel display 120, a touch sensor 130 and a positioning determining element 140. The panel display 120 and the touch sensor 130 are disposed at a first surface 112 and a second surface 114 opposite to the first surface 112 of the body 110, respectively.

The positioning determining element 140 is disposed in the body 110 for defining a conformal keyboard 160 corresponding to the shape of hands when the body 110 is held.

In FIG. 3, the body 110 includes a basic input module, a multi-media interface, a power management, a central processing unit (CPU). The basic input module may be keys or a pointer, the man-machine interface (MMI) may be a microphone (MIC) or a speaker, and the power management may be a battery and an adapter.

The touch sensor 130 is a touch panel. When the user holds the body 110, the thumbs of the two hands are usually placed on the first surface 112 of the body 110, the panel display 120 is usually disposed on the first surface 112, and the other four fingers are placed on a second surface 114 of the body 110 to cooperate with the thumbs to hold the body 110. In FIG. 2, the forefingers, the middle fingers, the third fingers and the little fingers are placed according to the habits of the user and contact with the touch sensor 130. The positioning determining element 140 disposed in the body 110 determines the shape of the user's hands according to the touch area on the touch sensor 130, and set-up the conformal keyboard 160 corresponding to the shape of the user's hands.

In the embodiment of the invention, the conformal keyboard 160 is a virtual keyboard which is not disposed on the portable device 100 physically. The shape of the user's hands is set-up according to the size and the length of the fingers, the touch area on the touch sensor 130 when the portable device is held, and the predicted extensible length of the fingers.

Since the conformal keyboard 160 is set-up according to the length of each finger, the keys of the conformal keyboard 160 are arranged approximately in sector shape to facilitate the user to operate the portable device 100. Furthermore, the positions at which the user usually put his fingers can be set-up as the hot keys to facilitate the user to input word strings or commands conveniently. In general, the panel display 120 of the portable device 100 may display a standard keyboard 170 by switching to allow the user to select the standard keyboard 170 or the conformal keyboard 160 to input word strings or commands. The definition of the keys of the conformal keyboard 160 corresponds to that of the standard keyboard 170.

Furthermore, the standard keyboard 170 is approximately in rectangular shape, and each of the keys is arranged in array. The conformal keyboard 160 is approximately divided to two parts such as the L sensor pad and the R sensor pad, and the two parts correspond to the left and the right hands of the user. The keys distributed in the conformal keyboard 160 relate to placing positions of the fingers in operating.

Each of the keys of the standard keyboard 170 is approximately rectangular in shape and each of the keys of the conformal keyboard 160 is irregular in shape, and the keys are arranged approximately sector in shape. Thus, when the user holds the portable device 100 with both hands, he or she not only can input word strings or commands on the panel display 120 using the thumbs, he or she also can input word strings or commands on the touch sensor 130 using other fingers.

Furthermore, the touch sensor 130 can receive a single touch signal or a multi touch signal simultaneously. Comparing to the conventional input method in which the user only can use the forefinger to touch the panel display 120, the portable device 100 in the invention is more convenient in usage.

The positioning determining element 140 is used for defining the position of each of the fingers and determining the shape of the user's hands to set-up the conformal keyboard 160 corresponding to the shape of the hands. As a result, a conformal keyboard is reset-up corresponding to different users to meet personal requirements. For example, for the user with normal hands and the user with disabled hands, a conformal keyboard is set-up correspondingly. Consequently, a conformal keyboard can also be set-up for the user with disabled hands, and the disable user need not use the standard keyboard inconveniently.

Additionally, the portable device 100 further includes an auxiliary element 150 disposed in the body 110 which is used for sending a alerting sound, a alerting light or vibrating to indicate that the conformal keyboard is set-up completely. The auxiliary element 150 in the embodiment may be a speaker, a bulb or other components which can make the user to receive the alerting signals such as by vibrating. When the conformal keyboard 160 is set-up, the auxiliary element 150 disposed in the body 110 sends an alerting sound, an alerting light or vibrates to inform that the definition of the conformal keyboard 160 is completed. Thus, the user can input commands or do other operations via the conformal keyboard 160.

Since the shape of the conformal keyboard 160 and the positions of the keys are different from that of the standard keyboard 170, the invention may provide a learning interface for the user to learn, be familiar with and memorize the positions of the keys of the conformal keyboard 160 corresponding to that of the standard keyboard 170. Thus, the user may operate the portable device 100 more quickly. For example, the learning interface may be the conformal keyboard 160 displayed on the panel display 120.

Since the touch sensor 130 can detect the multi touch signal or the single touch signal, the body 110 executes different programs according to the moving trace of the fingers detected by the touch sensor 130. For example, the user may touch the touch sensor 130 slightly, touch the body 110, or click the function key to switch between the cursor mode and the keyboard mode.

The user may execute the function correspondingly by touching the position of the key with one finger, move an open window by continuously moving one finger on the touch sensor 130, zoom out (or move a view closer) or zoom in an open window (or move a view farther) by moving two fingers inwardly or outwardly.

The commands corresponding to the moving traces of the fingers may be built in the body 110 or set-up by the user.

In sum, when the portable device in the invention is used, via the touch sensor and the positioning determining element, the conformal keyboard may be set-up according to the gesture of the user to allow the user to use a keyboard corresponding to the shape of his or her hands to do operations, which meets the personal requirements. Furthermore, the touch sensor detects a single touch signal or a multi touch signal, and the user may execute different programs or operations via different gestures of the fingers and their combinations on the touch sensor. As stated above, the portable device in the invention is very convenient in usage.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A portable device, comprising:
   a body;
   a panel display disposed at a first surface of the body;
   a touch sensor disposed at a second surface of the body, wherein the second surface is opposite to the first surface; and
   a positioning determining element disposed in the body for determining a holding position and defining a conformal keyboard corresponding to the shape of hands when the body is held, wherein the panel display displays a standard keyboard, and the standard keyboard and the conformal keyboard respectively exist on the first surface and the second surface at the same time, wherein the conformal keyboard is a virtual keyboard, a plurality of keys are distributed in the conformal keyboard related to placing positions of fingers when the body is held, and each of the keys of the conformal keyboard is irregular in shape.

2. The portable device according to claim 1, further comprising an auxiliary element disposed in the body.

3. The portable device according to claim 2, wherein the auxiliary element sends a alerting sound or a alerting light, or vibrates to indicate that the conformal keyboard is set-up completely.

4. The portable device according to claim 1, wherein the touch sensor is a touch panel.

5. The portable device according to claim 1, wherein the conformal keyboard is a virtual keyboard.

6. The portable device according to claim 1, wherein the definition of keys of the conformal keyboard corresponds to that of the standard keyboard.

7. The portable device according to claim 1, wherein the touch sensor detects a multi touch signal and a single touch signal.

8. The portable device according to claim 7, wherein the body executes different programs according to moving trace of a multi touch signal detected by the touch sensor.

* * * * *